Feb. 17, 1970 A. L. ANDRASFAY 3,496,283

TERMINAL CONSTRUCTION FOR ELECTRICAL CIRCUIT DEVICE

Filed June 25, 1968 3 Sheets-Sheet 1

INVENTOR
ANTHONY L. ANDRASFAY
BY Gerd L. Mellhoff
ATTORNEY

TERMINAL CONSTRUCTION FOR ELECTRICAL CIRCUIT DEVICE

Filed June 25, 1968

INVENTOR.
ANTHONY L. ANDRASFAY

BY Gerd L Mahlhoff

ATTORNEY

INVENTOR.
ANTHONY L. ANDRASFAY
BY
ATTORNEY

United States Patent Office 3,496,283

Patented Feb. 17, 1970

3,496,283

TERMINAL CONSTRUCTION FOR ELECTRICAL CIRCUIT DEVICE

Anthony L. Andrasfay, Huntington Beach., Calif., assignor to Beckman Instruments, Inc., a corporation of California Filed June 25, 1968, Ser. No. 739,861
Int. Cl. H05k *1/04*
U.S. Cl. 174—68.5 11 Claims

ABSTRACT OF THE DISCLOSURE

An electrical assembly formed of a nonconductive base member adapted to receive and support a variety of electrical components on at least one surface thereof and including at least one wire terminal attached within a slot formed in an edge of the base member. The terminal is provided with a plurality of reverse bends or folds on one end thereof which are compressed within the slot to deform the bends or folds and produce an interference fit between the sides of the slot and the deformed folds of the wire terminal. The other end of the wire terminal protrudes outwardly from the base member for connecting the device into an electrical circuit.

This invention is particularly applicable to electrical circuit devices such as electrical circuit boards, and microcircuit networks deposited on a ceramic or plastic wafer. The surface of the base member or wafer has deposited thereon an electrical network formed of an electrically conductive material and may also include various deposited or discrete components, such as capacitors, resistors and transistor devices which are electrically connected into the deposited electrical network. The device requires some means for electrically connecting the electrical network into external sources of power or for electrically connecting it with other electrical apparatus.

In micromodule technology, various termination arrangements have been employed in the pact, such as lead wires soldered to the deposited layer material. Since this layer of material is, in most cases, extremely thin it is difficult to obtain a good strong bond between the terminal member and the conductive layer. In the past, attempts have been made to reinforce these conductive layers by adding additional solder material, but this method is difficult to control and sometimes results in overlapping of the adjacent conductive circuitry. Without a strong bond, it is easy for the leads or terminals to become separated from the circuit element during handling and use thereof. An improved terminal lead construction is disclosed in the application of James R. Chesemore, Ser. No. 712,230, filed Mar. 11, 1968, and assigned to Beckman Instruments, Inc., the assignee of the present application. The present invention is an improvement over the Chesemore invention.

For a better understanding of the invention, reference may be had to the accompanying drawings in which.

Figure 1:
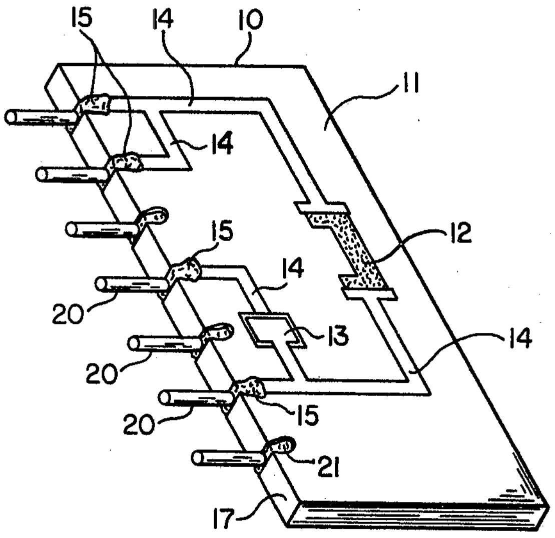
FIGURE 1 is a perspective view of a nonconductive base member in the form of a thin wafer supporting an electrical network.

Referring now to FIGURE 1, there is shown an enlarged view of a microminiature circuit element including a suitable nonconductive base member or substrate 10, having deposited on a flat surface 11 thereof a resistance element 12 and a capacitor element 13 which are, in turn, connected by a network of electrically conductive material 14, also deposited on the surface of the base member. The base member may be formed of any suitable nonconductive material, such as a plastic material, or a high temperature resistant ceramic material, such as alumina, steatite or other nonconductive material well-known in the art.

The electrically conductive film pattern or network provides an electrical path connecting the various electrical devices and may be formed in any desired arrangement required for the desired electrical function to be attained. The circuit elements, such as the resistor 12 and capacitor 13, shown attached to the illustrated base member 10, are merely exemplary of the type of electrical components that are commonly employed in microcircuit devices. It should be understood that other conductive electrical networks and elements, such as transistors and diodes may also be attached to the surface or surfaces of the base member. The microcircuit module illustrated in FIGURE 1, discloses only one embodiment of a microcircuit device and it will be understood that there is no intention to limit the invention to the particular circuitry or components disclosed. On the contrary, as will be hereinafter described, the terminal structure and its method of assembly is broadly applicable to various types of electrical devices regardless of the network pattern, the electrical components attached to the base or the function of the electrical device itself.

Figure 2:
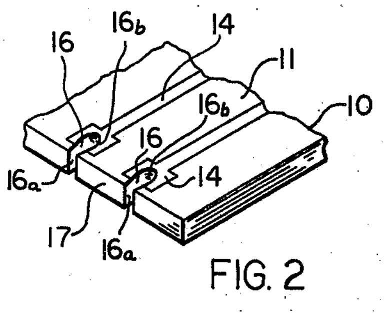
FIGURE 2 is a partial perspective view showing the slots formed in the edge of the base member before attachment of the terminal and illustrating one arrangement of the conductive material deposited around the edges of the slots.

As may be seen by reference to FIGURE 2, the base member 10 is provided with a plurality of slots 16 formed therein along an edge 17. In the preferred embodiment of the invention, the slots extend through the entire thickness of the base member 10 and communicate with the surfaces 11 on opposite sides of the base member. Each slot is preferably formed narrow at its opening 16*a* along the edge 17 of the base member with the side walls of the slot diverging toward the rear 16*b* or bottom of the slot 16. In the embodiment disclosed, the slots 16 are rounded adjacent their rear surfaces 16*b*. The conductive pattern 14 is deposited adjacent the edges of the slots 16 and, as may be seen in FIGURE 2, this conductive material may actually surround a portion of the respective slots.

As will be seen in FIGURE 1, the substrate base member has a plurality of terminal members extending outwardly from the edge 17 thereof. These terminals, which are generally designated by the reference numeral 20, serve to connect the electrical network carried on the base member to an external source of power or connect the electrical network with other electrical devices. As may be seen in FIGURE 3, each terminal member is formed of a length of commercially available conductive wire, which is typically a slender rod having a circular cross-section. It is not necessary that the wire be circular, although this is the most common shape found. One example of such wire would comprise a conductive deformable material such as annealed copper. For reasons which will become apparent hereinafter, it is desirable that the wire be somewhat malleable.

Figure 3:
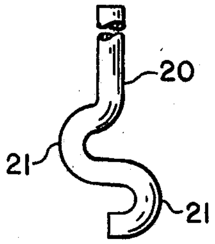
FIGURE 3 is a plan view of a terminal wire having a plurality of reverse bends forming an S-shaped configuration on one end thereof.

As shown in FIGURE 3, the wire is formed with a number of reversed bends, folds or convolutions in one portion thereof, such as bends or folds 21. The folds all lie in the same plane, such as the plane of the drawing of FIGURE 3. The bending operation may be performed at any stage of production that may be convenient. While the bends or folds 21 shown in the example of FIGURE 3 are at the end portion of the terminal or wire rod 20, other variations are possible, such as making the bends or folds in the center of the rod in the manner shown in FIGURE 15.

Figure 4:
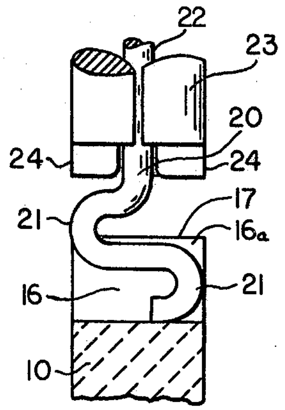
FIGURE 4 is a partial cross-sectional view of the base member with the wire terminal inserted within the slot and illustrating the swaging tool positioned to compress the bends of the termiual within the slot.

As will be seen in FIGURE 4, the bends or folds of the terminal wire 20 are inserted into one of the slots 16 formed in the edge 17 of the base member and so arranged that pressure on the bends will cause them to fold into the slot. As may be seen in FIGURE 4, the terminal 20 is supported or held within a collet 23 or other suitable holding device having a central opening through which the outwardly extending pin section 22 of the terminal member may extend.

Figure 5:
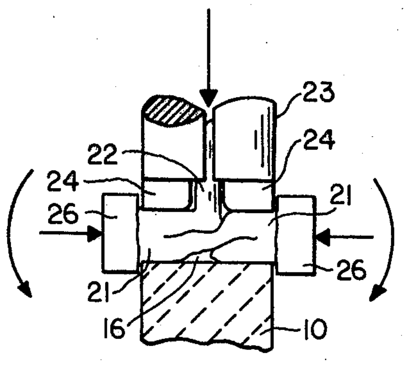
FIGURE 5 is a cross-sectional view schematically illustrating the step of compressing or swaging a wire terminal member within a slot of the base member.

As may best be seen in FIGURES 4 and 5, the collet is provided with swaging or compression tangs 24 having a width slightly less than that of the opening to the slot 16. Swaging tangs 24 are positioned over the opening 16*a* of the slot and, as may be seen in FIGURE 5, the force on the collet compresses the bends or turns in the wire within the slot 16. During the compression step, the tangs force the wire turns to be deformed and made thicker within the slot.

Figure 6:
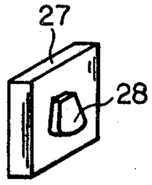
FIGURE 6 is a perspective view of one embodiment of a compression plate adapted to apply a compressive force in a direction normal to the swaging tool.

In order to perform the swaging operation, it is necessary to apply a force against the wire bends in a direction substantially normal to the force exerted by the swaging tool or collet 23. This force is represented somewhat schematically by the plates or presses 26, forced against the openings in the slot on the opposite surfaces of the base member 10. Plates 26 may be stationary plates or they may be of a size and shape adapted to fit within the end openings of the slot 16 to further compress the bends 21 within the slot. Such a pressure plate is illustrated by the plate 27 in FIGURE 6 having the formed pressure insert 28 adapted to fit within the side opening of a slot formed in the base member. Such a plate would further compress and deform the wire bends within the slot in a manner similar to that of tangs 24, which extend into the open mouth of the slot.

In actual practice, it is desirable to use both the lateral and axial forces respectively of the collet tangs 24 and the plates 26. These may be applied simultaneously or at different stages to accomplish variations in the deformed structure. Thus, for example, if the collet tang is first pressed into the slot and the plates 26 then employed to apply pressure against the bends a certain portion of the bends may be deformed outside the axial length of the slot. In this way a small portion 27 of the wire is deformed over the edges of the slot to lock the wire into the slot and to make good electrical contact with the conductive material 14 formed adjacent the edges of the slot. In order to enhance this action, the axial force applied by the swaging plates 26 may be a rolling motion as indicated by the arrows in FIGURE 5.

Figure 7:
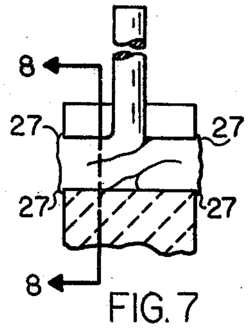
FIGURE 7 is a cross-sectional view, similar to that of FIGURE 5, illustrating the compressed or upset wire terminal and illustrating the overlap of the ends against the surfaces of the base member.
Figure 8:
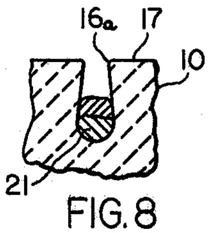
FIGURE 8 is a cross-sectional view taken along line 8—8 of FIGURE 7.
Figure 10:
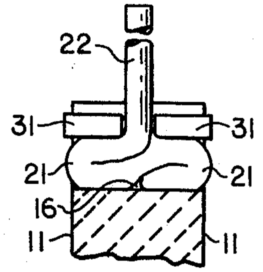
FIGURE 10 is a cross-sectional view of a terminal within a slot and illustrating locking segments positioned therein.

By maintaining the axial force of the tangs 24 against the wire bends during application of the force normal thereto from the plates 26, the folds or bends of the wire terminal are prevented from opening and the wire is upset or changed in thickness within the slot. The resulting deformed terminal 16 appears substantially as shown in FIGURES 7 and 8 after the swaging tools are removed. As will be noted in the cross-sectional view of FIGURE 8, the wire bends 27 are no longer circular but have been greatly deformed within the slot. The horizontal thickness (as seen in FIG. 8) of the wire bends 21 has been greatly increased so that removal of the bends through the opening 16*a* of the slot is no longer possible. The bends are flattened or upset within the slot and form a mechanical interference fit with the diverging sides of the slot.

Figure 11:
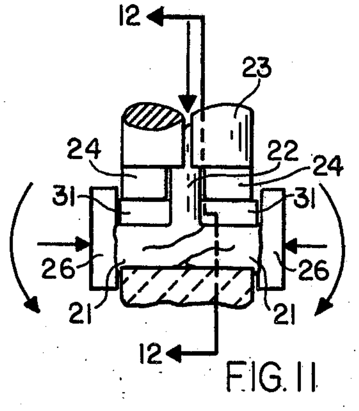
FIGURE 11 is a cross-sectional view illustrating schematically the swaging operation designed to upset the wire locking segments within a slot formed in the base member.
Figure 9:
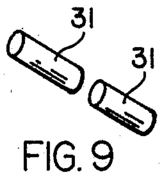
FIGURE 9 is a perspective view illustrating a pair of wire locking segments adapted for positioning within a slot of the base member.
Figure 12:
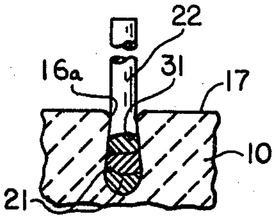
FIGURE 12 is a cross-sectional view taken substantially along line 12—12 of FIGURE 11.

While the wire terminal will support itself within the slot 16 when swaged therein, as shown in FIGURES 7 and 8, it may be desirable to further lock the terminal bends in place by use of locking segments 31, which are shown in FIGURES 9–12. Locking segments 31 comprise a pair of wire segments formed of a wire material similar to that used for the terminal member and are inserted on opposite sides of the outwardly extending pin section 22 after the wire turns have been compressed within the slot. Note in FIGURE 10 that a force normal to the surfaces 11 of the base has not as yet been applied, since the folds or bends 21 of the terminal member protrude out the surface openings of the slot 16. The wire segments 31 are then positioned on the deformed bends 21 and the force of the collet tangs 24 is again applied as shown in FIGURE 11. Plates 26 are forced against the side openings of the slot 16 so that the bends 21 of the wire are further deformed and the locking segments 31 are swaged into the space above the reverse bends of the wire within the slot 16. The swaged terminal and locking segments 31 are forced to conform to the shape of the slot 16 with the sides of the slot forming a mechanical interference fit with the swaged bends 21 and the locking segments 31. The locking segments 30 effectively secure the folds of the terminal wire in place, as will be seen in FIGURE 12. Any tension applied against the outwardly extending pin 22 is resisted not only by the deformed bends 21 of the terminal but also by the deformed locking segments 31 which prevent any outward movement of the terminal wire and also serve to prevent opening of the folds of the wire.

A terminal has been constructed from 24 gauge (.020" diameter) annealed copper wire and fabricated according to the above described embodiment using locking segments. The wire was bent into the previously described S shape as shown in FIGURE 3 and swaged within the slot at a pressure of 85–100 pounds. The resulting terminal with the locking segments deformed thereover was tensile tested to failure and yielded at approximately 10 pounds tension. This tension was equal to the tensile strength of the wire employed for the terminal.

Figure 13:
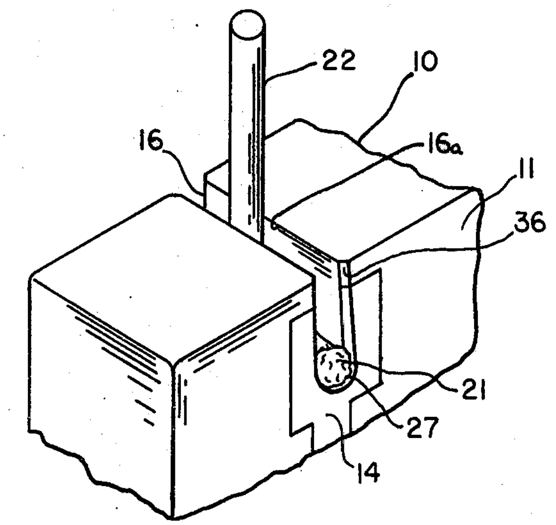
FIGURE 13 is an enlarged perspective view illustrating a terminal supported within a slot in the base member with the folds of the terminal wire compressed within a relieved portion of the slot.

Referring now to FIGURE 13, there is shown another embodiment of the invention in which the slot is provided with a chamfered or relieved edge 36 adjacent the junction of the sides of the slot and the surface 11 of the base member 10. The conductive material 14 is deposited on the chamfered edge 36. As will be noted in FIGURE 13, the wire pin section 22 extends out the mouth 16*a* of the opening of the slot 16 and the deformed bend 21 retains the pin terminals in place within the slot. In this embodiment of the invention, the deformed bends 21 are actually upset with the peened-over edge 27 of the bend being forced to flow into the chamfered space at the edge of the slot. In this embodiment of the invention, the peened-over portion 27 does not extend above the surface 11 of the base member, yet still make good contact with the conductive material 14 deposited on the chamfered edge 36 of the slot. If desired locking segments, such as segments 31 disclosed in FIGURES 9–12 may be upset within the slot to further retain the terminal member in place.

Figure 15:
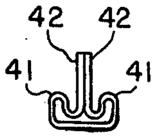
FIGURES 14–16 are plan views illustrating three different folded end configurations for the terminal.
Figure 16:
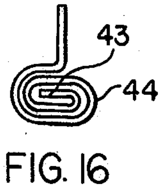
Figure 14:
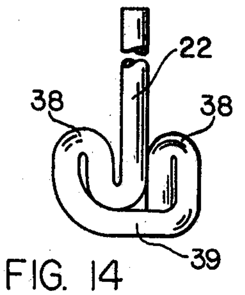

While the terminal member 20 illustrated in FIGURE 3 has reverse bends forming an S shape, it is not intended that this shape is the only possible configuration for the bends of the terminal wire. Other configurations are also possible, such as those illustrated in FIGURES 14–16. In FIGURE 14 the reverse bends are axial with respect to the longitudinal length of the outwardly extending section 22 and a section 39 of the wire passing normal to the pin section 22 beneath the folds 38 of the wire. All of the bends or folds are in the same plane as that of the drawing. In FIGURE 15, the folds 41 are formed in a central section of the wire and the outwardly extending pin section comprises both ends 42 of the wire. In FIGURE 16, the folds 44 are wound in spiral shape around one end 43 of the wire. In every instance, the folds lie in a single plane so that they may be inserted into the opening 16*a* of a slot.

Obviously it is not essential that the pin section extend directly outwardly from the slot 16. As may be seen in FIGURE 17, the outwardly extending pin section 46 may be formed into a loop or other desirable configuration for convenient attachment to a source of electrical power.

Figure 17:
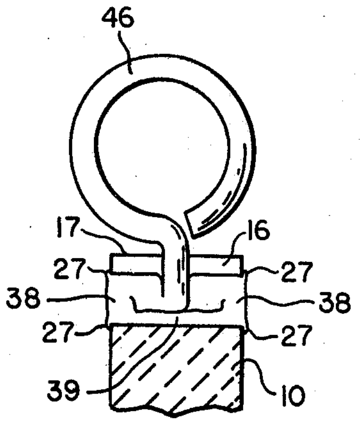
FIGURE 17 is a cross-sectional view of a slot illustrating a terminal member of the type shown in FIGURE 14 after it is deformed or compressed within a slot in the base member.

FIGURE 17 also illustrates, in somewhat schematic form, how the bends 38 of the terminal wire, shown in FIGURE 14, appear when upset or deformed within a slot. Of course, the swaging or deforming operation is preferably performed before the outwardly extending pin section is formed into a loop 46.

Figure 18:
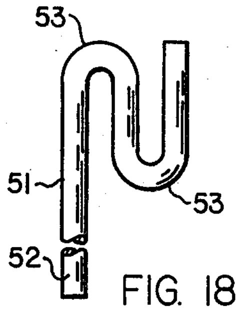
FIGURE 18 illustrates another folding arrangement for a terminal pin.
Figure 19:
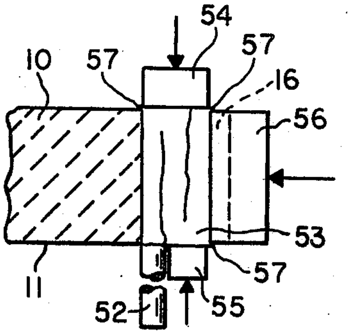
FIGURE 19 is another cross-sectional view showing the terminal member of FIGURE 18 swaged into a slot formed in the base member so that the end thereof extends outwardly normal to the surface of the base member.

In all of the previous embodiments, the outwardly extending pin section protruded through the mouth 16*a* of the slot and extended generally in the same plane as that of the thin substrate member or base 10. In the embodiment shown in FIGURES 18 and 19, the terminal pin 51 is shaped so that the outwardly extending end portion 52 protrudes normal to the surface 11 of the base member 10. In this embodiment, the reverse bends form an S-shape configuration, which is inserted within the slot 16 of the base member where it is upset by axial force from plates 54 and 55 exerted along the longitudinal axis of the slot 16 and a third pressure plate 56 inserted through the mouth of the opening to the slot 16. As shown in FIGURE 19, when the folds or reversed bends 53 of the terminal wire are upset or deformed within the slot the peened-over edges 57 make good electrical contact with the surface 11 of the base member and the conductive material deposited thereon. The peened-over edges 57 also prevent disengagement of the pin from the slot 16 when a force or tension is applied along the longitudinal axis of the outwardly extending end 52.

While the electrical connection between the upset or deformed bends in the terminal and the conductive layer 14 is, in most instances, very good, it may also be desirable, in order to assure an improved electrical connection, to apply a solder coating or other electrically conductive coating to the deformed bends of the terminal wire. As may be seen in FIGURE 1, soldered coating 15 of conductive material may be deposited within the slot and over the deformed end portion of the bends 21 so that it makes electrical contact with the deposited material 14. In this way, an electrical connection is assured. The solder coating also serves to strengthen the structural support of the terminal wire within the slot. Another variation of this technique involves the use of a solder coated to the wire which may then be bent and swaged into the slot 16, as previously described. The folds of solder coated wire may then be heated, either by solder dipping or otherwise, so that the folded portions or reversely bent ends of the wire become soldered or braised to each other, thereby forming a solid mass within the slot.

While in accordance with the patent statutes there have been described what at present are considered to be preferred embodiments of the invention, it will be obvious to those skilled in the art that various changes and modifications may be made therein without departing from the invention.

What is claimed is:

1. An electrical assembly comprising:

a nonconductive base member adapted to support electrical components on at least one surface thereof;

at least one slot formed in an edge of said base member, said slot communicating with said one surface thereof;

an electrically conductive material bonded to said base member in a pattern forming electrical connectors to said electrical components adapted to be supported on said base member, at least one of said connectors extending substantially to an edge portion of said slot in said base member;

a terminal member comprising a conductive wire having an original cross-sectional thickness permitting it to fit into said slot, a plurality of reverse bends formed in said wire and compressed within said slot one on top of the other to deform said wire bends within said slot thereby producing a positive mechanical interference fit between said bends of said wire and the sides of said slot, said other end of said wire terminal protruding outwardly from said slot; and an electrical connection between said deformed bends of said wire terminal and said electrical conductive connector along said edge portion of said slot.

2. The electrical assembly defined in claim 1 in which said slot is formed with the sides diverging in a direction away from the opening in said edge of said base member.

3. The electrical assembly defined in claim 1 in which said slot is narrow at its opening in said edge of said base member and wider within said base member thereby providing a constricted opening along said edge of said base member.

4. The electrical assembly defined in claim 1 in which said electrical connection between said deformed bends in said wire and said electrically conductive connector comprises a portion of said bends deformed against said electrically conductive connector along said edge portion of said slot.

5. The electrical assembly defined in claim 1 in which a portion of said slot adjacent the surface of said base member is relieved and said electrical conductive connector extends into said relieved portion of said slot adjacent the surface of said base member and said bends of said wire terminal are compressed into said relieved portion of said slot to make electrical contact with said electrically conductive connector.

6. The electrical assembly defined in claim 1 in which said terminal member is formed of an annealed copper wire and one end of said wire is formed substantially into an S shape which is compressed within said slot.

7. The electrical assembly defined in claim 1 in which said electrical connection between said deformed bends and said electrically conductive connector comprises an electrically conductive solder material deposited over a portion of said electrically conductive connector and the exposed portions of said deformed bends in said slot.

8. An electrical assembly comprising:

a thin nonconductive base member having oppositely disposed parallel surfaces, at least one of said surfaces being adapted to support electrical components thereon;

at least one slot formed in an edge of said base member, said slot communicating at opposite ends thereof with said opposite surfaces of said base member and having an opening along said edge of said base member;

an electrically conductive material bonded to at least one surface of said base member in a pattern forming electrical connectors between said electrical components adapted to be supported on said base member, at least one of said connectors extending substantially to an edge portion of said slot in said base member;

a terminal member in the form of a conductive wire having a plurality of convolutions formed on one end thereof and compressed within said slot one against the other to deform said convolutions within said slot thereby producing a positive mechanical interference fit between said convolutions of said wire terminal and the sides of said slot, said other end of said wire terminal protruding outwardly from said slot through said opening in the edge thereof; and an electrical connection between said deformed bends of said wire terminal and said electrically conductive connector along said edge portion of said slot.

9. A method of making a circuit element comprising the steps of:

providing a nonconductive base member having a surface adapted to support electrical components thereon;

forming at least one slot in an edge of said base member, said slot extending through and communicating with said surface adapted to support said electrical component;

depositing a layer of conductive material on said surface of said base member in a pattern forming electrical connectors between said electrical components adapted to be supported on said base member, at least one of said electrical connectors being deposited adjacent an edge of said slot formed in said base member;

providing a wire terminal member having a thickness adapted to fit into said opening of said slot formed along said edge of said base member;

forming a plurality of folds in a portion of said wire terminal;

positioning said wire terminal with said folds disposed coincident with a plane extending from the opening of said slot along said edge of said base member;

applying a compressive force to said folds in said wire terminal to deform said folds within said slot thereby producing a positive mechanical interference fit between said folds of said wire terminal and the sides of said slot thereby supporting said terminal member within said slot with at least one end thereof extending out an opening of said slot.

10. The method defined in claim 9 in which said compressive force is applied in a direction substantially normal to opening of said slot along the edge of said base member.

11. The method defined in claim 9 in which said compressive force comprises a first force applied through the opening of said slot in the edge of said base member, said first force being directed substantially toward the bottom of said slot and also includes a second compressive force applied against said wire folds in a direction substantially normal to said first force in the region adjacent the junction of the slot opening and the surfaces of said base member.

References Cited

UNITED STATES PATENTS 2,413,539 12/1946 Ballard.
3,280,378 10/1966 Brady et al.

FOREIGN PATENTS 1,354,368 1/1964 France.

DARRELL L. CLAY, Primary Examiner

U.S. Cl. X.R.

29—626; 317—101; 338—312, 322; 339—17, 220